US006325449B1

(12) United States Patent
Sorensen et al.

(10) Patent No.: US 6,325,449 B1
(45) Date of Patent: Dec. 4, 2001

(54) ROPS STRUCTURE FOR WORK VEHICLE

(75) Inventors: Richard Carl Sorensen, Dubuque; Kenneth Michael Weiler, Bettendorf, both of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/590,644

(22) Filed: Jun. 8, 2000

(51) Int. Cl.⁷ .................................................. B62D 33/077
(52) U.S. Cl. .............................. 296/190.08; 296/190.01; 296/102; 52/735.1
(58) Field of Search .................... 296/190.01, 190.03, 296/190.08, 190.1, 96.21, 102; 52/735.1

(56) References Cited

U.S. PATENT DOCUMENTS

| | | | |
|---|---|---|---|
| 3,881,769 | * 5/1975 | Metzke | 296/190.08 |
| 4,600,236 | 7/1986 | Weiss et al. | 296/190 |
| 4,605,259 | * 8/1986 | Hurlburt | 296/190.08 |
| 4,650,242 | * 3/1987 | Obe et al. | 296/190.08 |
| 4,652,043 | 3/1987 | Hurlburt | 296/190 |
| 4,721,031 | 1/1988 | Nakata et al. | 98/2.09 |
| 4,772,065 | 9/1988 | Nakata et al. | 264/279 |
| 5,273,340 | 12/1993 | Nelson et al. | 296/190 |
| 5,413,188 | * 5/1995 | Ui | 180/89.12 |
| 5,820,199 | 10/1998 | Camplin et al. | 296/102 |

* cited by examiner

Primary Examiner—Stephen T. Gordon
Assistant Examiner—Paul Chenevert

(57) ABSTRACT

A four post ROPS is provided with left and right front vertical posts and left and right rear vertical posts. The rear vertical posts have a bottom portion that extends upwardly, forwardly and outwardly from the floor of the operator's station. Each left and right front vertical post has an arrowhead shaped cross section. The arrow shaped cross section has a main lobe, a secondary lobe and a connecting portion located between the two lobes. The arrowhead shaped cross section defines a windshield channel for receiving the side edge of the windshield, and a side door channel for receiving the side edge of the side door. The arrowhead shape has an elongated axis that is in line with the line of sight of the operator when driving the backhoe loader.

9 Claims, 6 Drawing Sheets

LINE OF SIGHT OF OPERATOR

ROPS STRUCTURE FOR WORK VEHICLE

BACKGROUND OF THE INVENTION

1. Field of the Invention

The present invention is directed to the configuration of the forward and rear vertical posts of a roll over protection system (ROPS) of a work vehicle.

2. Description of the Prior Art

The operator's stations of most work vehicles are provided with a ROPS. Typically the ROPS is mounted to the floor of the operator station and comprises two or four vertically extending posts that are coupled to one another by longitudinally and laterally extending members. To provide sufficient strength to protect the operator in a large work vehicle the vertical posts have a large cross section and disrupt the operators vision lines to the work implements. This is especially true with backhoe loaders. Operators of backhoe loaders drive and work the loader while facing forward. When operating the backhoe, the operator rotates the seat 180 degrees and faces rearward. Therefore it is important for the operator to have good vision lines to the front during driving and loader operations and to the rear during backhoe operations.

SUMMARY

It is an object of the present invention to provided a ROPS structure having improved visibility.

A four post ROPS is provided with left and right front vertical posts and left and right rear vertical posts. The rear vertical posts have a bottom portion that extends upwardly, forwardly and outwardly from the floor of the operator's station. In this way the side visibility of the operator is increased when operating the backhoe. In addition, toe and knee clearance is increased for the operator when rotating the operator's seat.

Each left and right front vertical post has an arrowhead shaped cross section. The arrow shaped cross section has a main lobe, a secondary lobe and a connecting portion located between the two lobes. The arrowhead shaped cross section defines a windshield channel for receiving the side edge of the windshield, and a side door channel for receiving the side edge of the side door. The arrowhead shape has an elongated axis that is in line with the line of sight of the operator when driving the backhoe loader.

DETAILED DESCRIPTION

Figure 1:
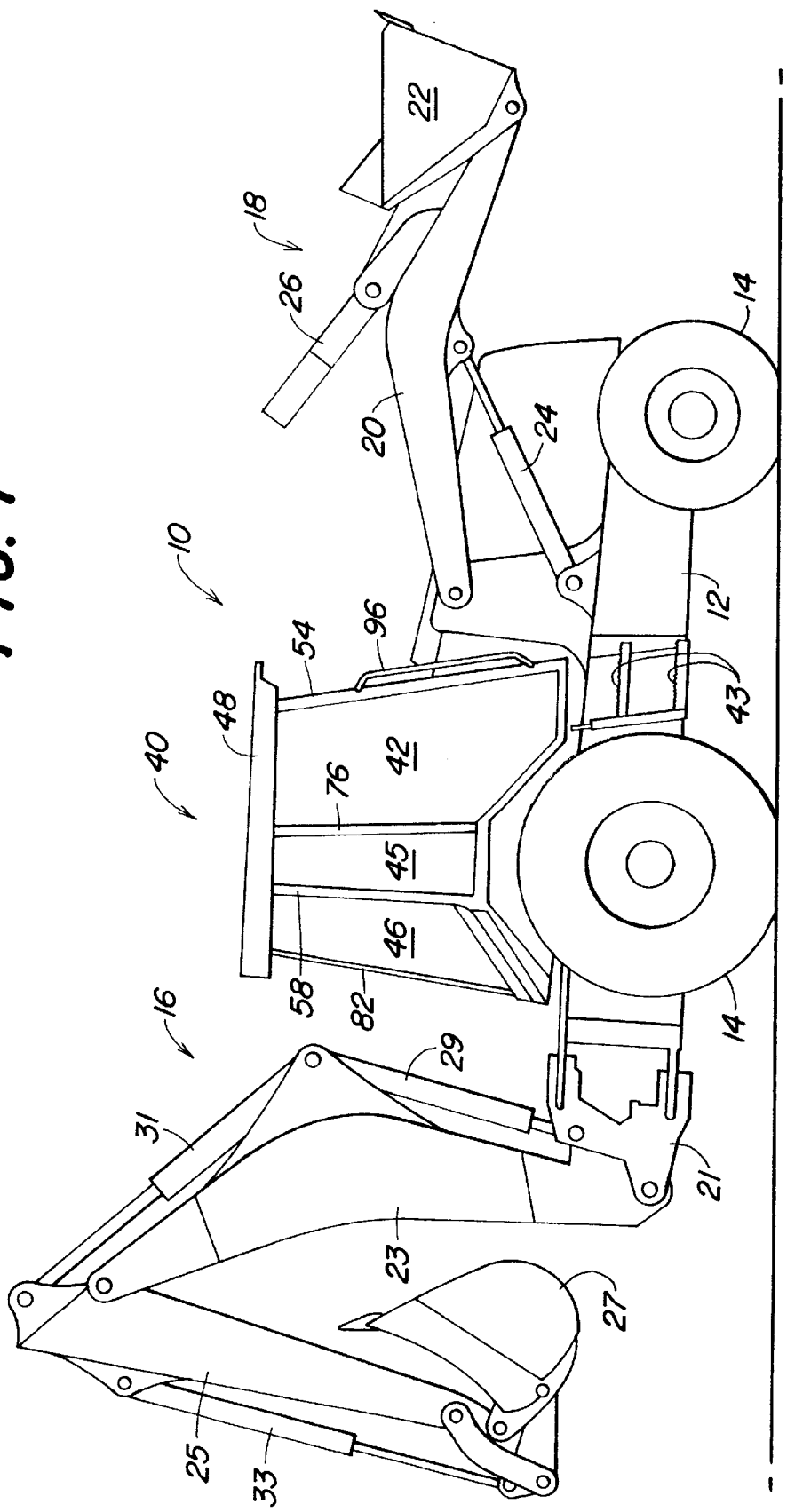
FIG. 1 is a side view of a backhoe loader work vehicle.
Figure 2:
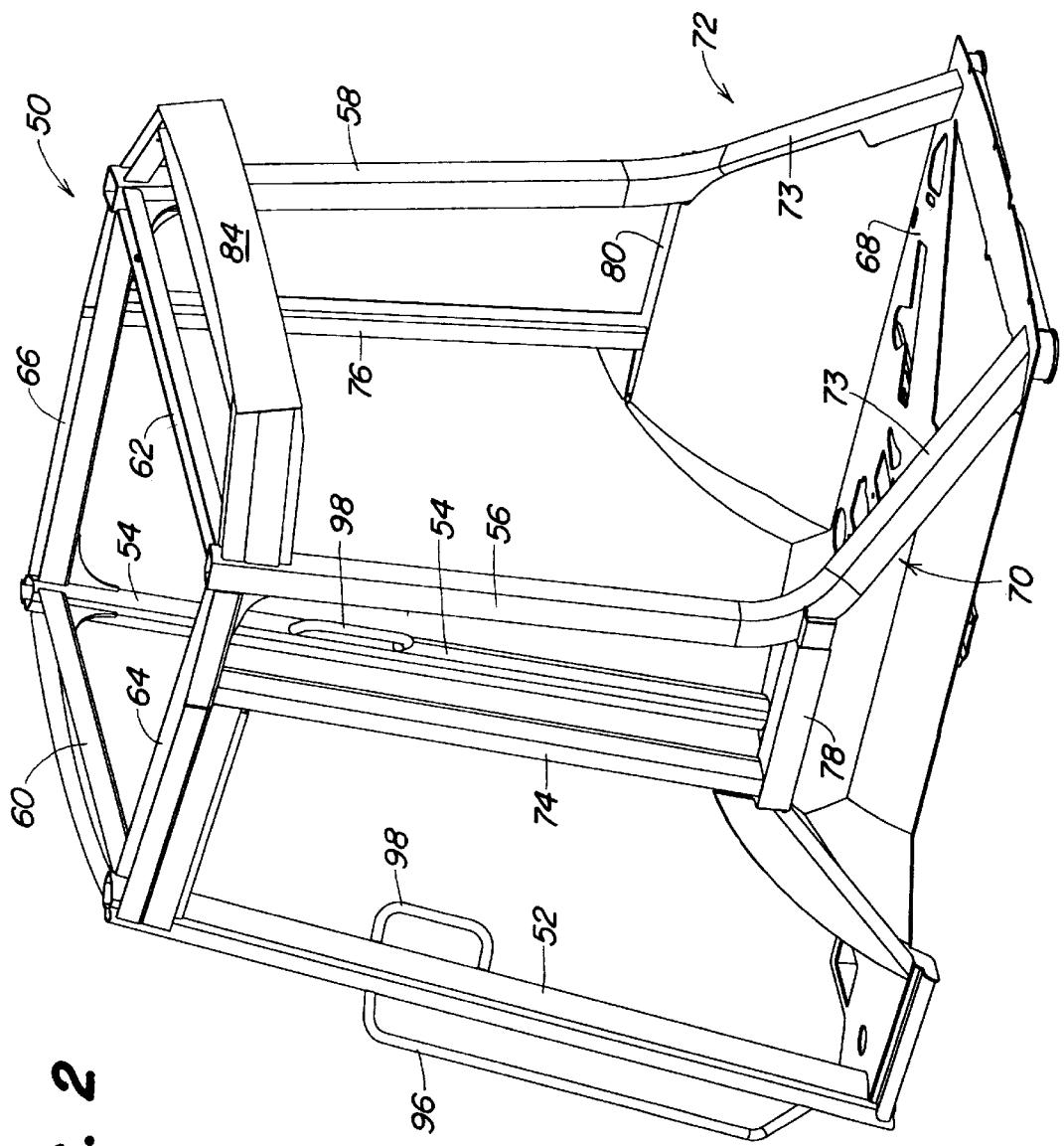
FIG. 2 is a perspective view of a ROPS of the present invention.
Figure 3:
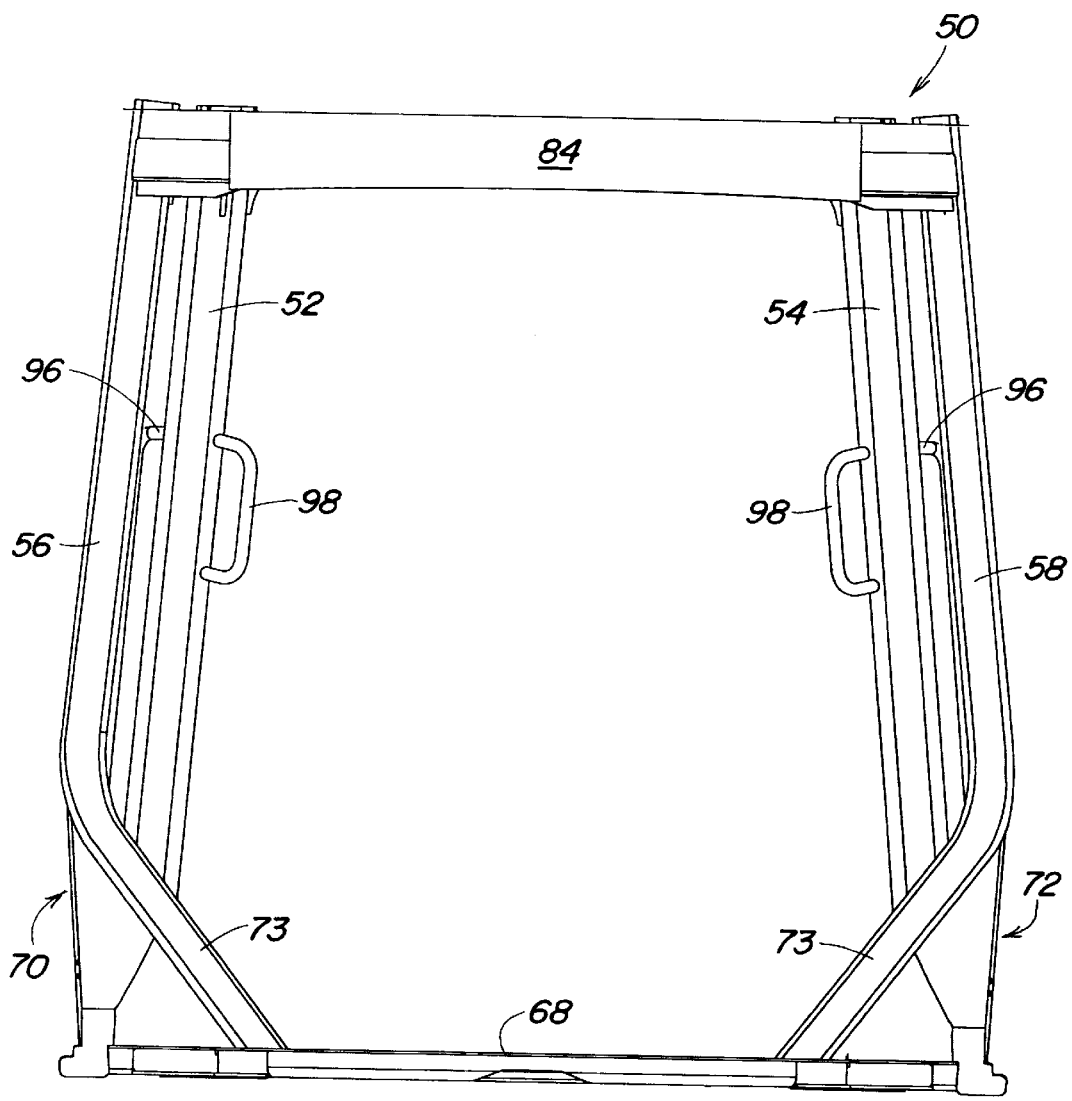
FIG. 3 is a rear view of the ROPS of the present invention.
Figure 4:
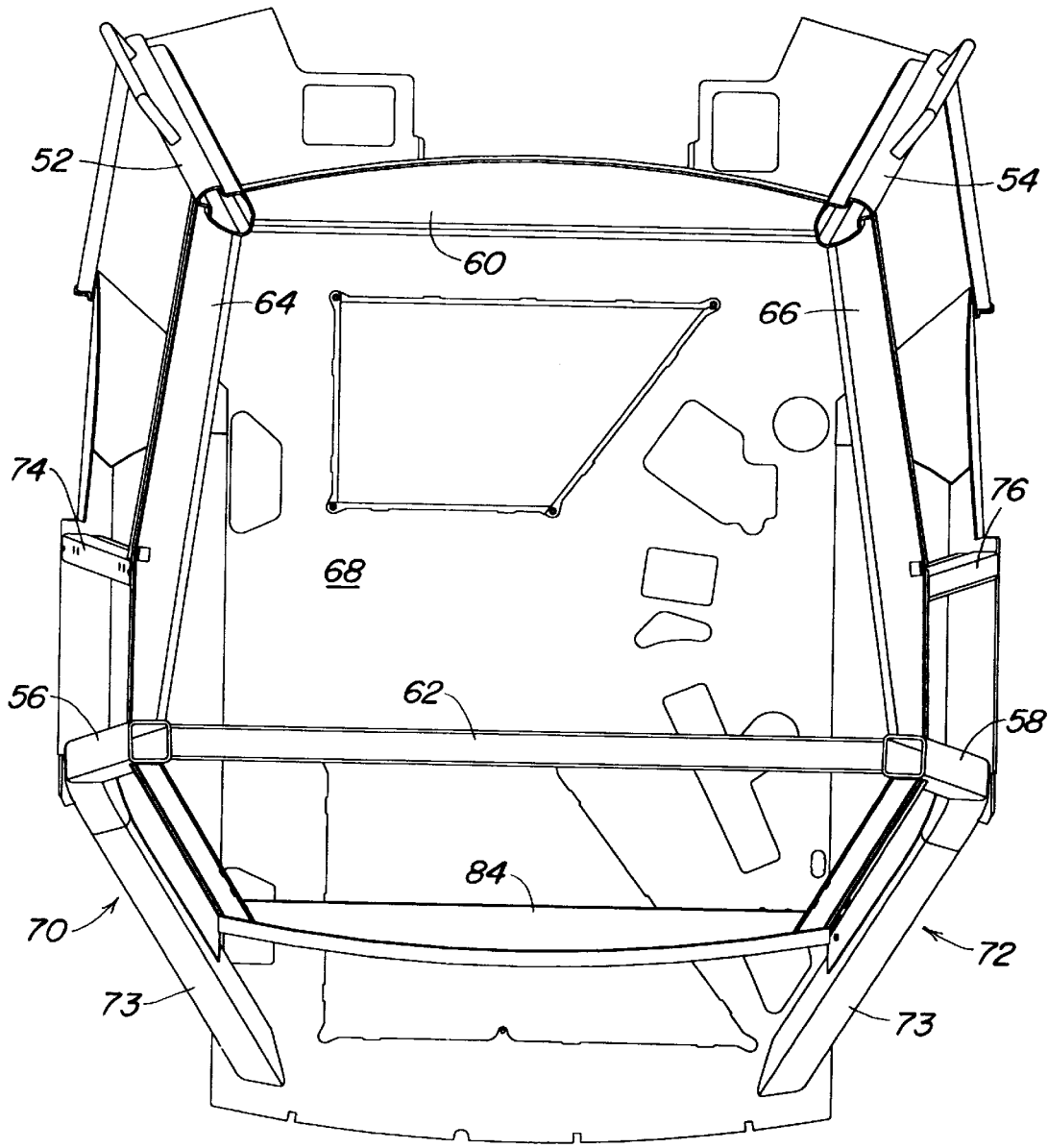
FIG. 4 is a top view of the ROPS of the present invention.
Figure 5:
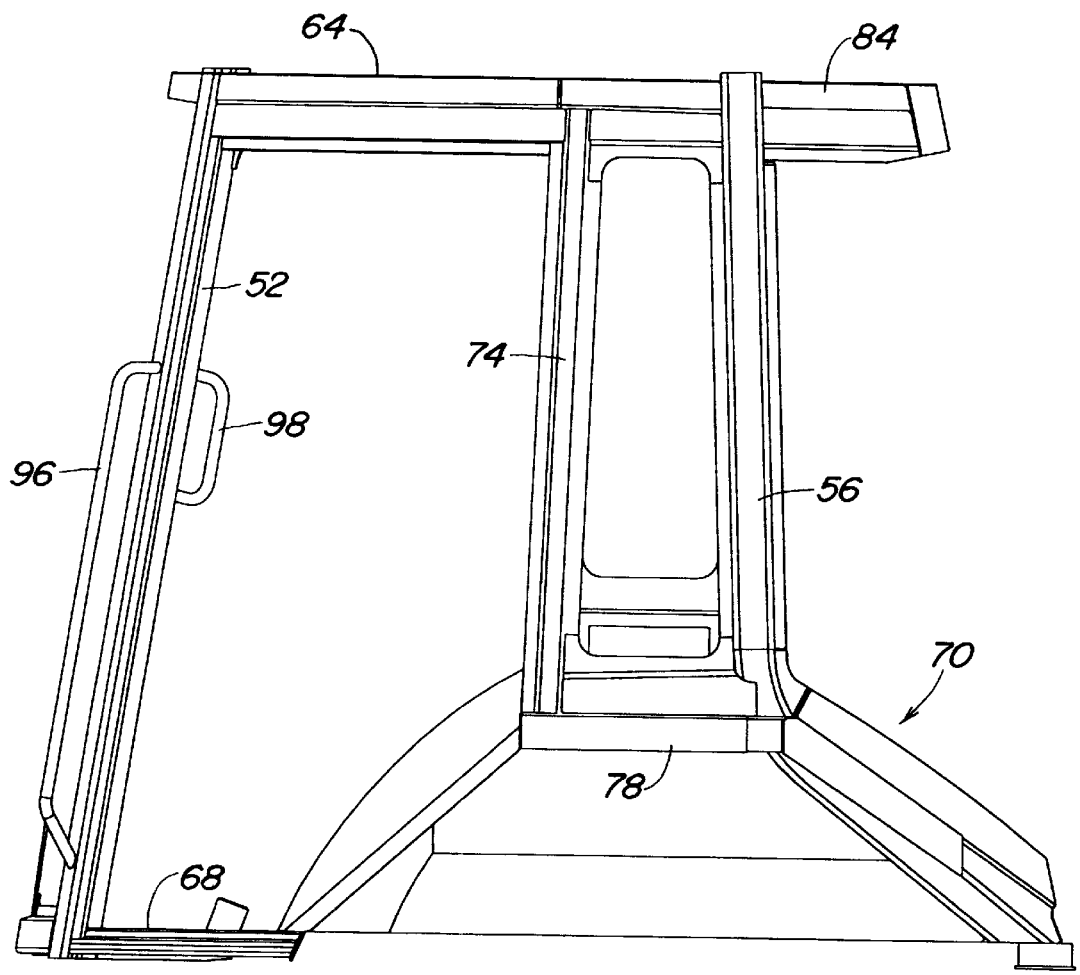
FIG. 5 is a side view of the ROPS of the present invention.

The work vehicle 10 illustrated in FIG. 1 is a loader backhoe. The work vehicle 10 is provided with a frame 12 and ground engaging means 14 comprising wheels, which support and propel the frame 12. Although the ground engaging means 14 of the illustrated embodiment are wheels, the present invention could also be used on tracked work vehicles having steel or rubber tracks. The frame 12 is provided with two work implements, a rear mounted backhoe 16 and a front mounted loader 18.

The loader is mounted to the front of the frame 12 and comprises lift arms 20 and a bucket 22. The lift arms 20 are provided with lift arm hydraulic cylinders 24 for lifting the arms 20 relative to the supporting structure 12. The bucket 22 is pivotally mounted to the end of the lift arms 20. Bucket 22 is provided with a bucket-tilt hydraulic cylinder 26 for tilting the bucket 22 relative to the lift arms 20.

The backhoe 16 is mounted to the rear of the frame 12 and comprises a swing frame 21, a boom 23, a dipperstick 25 and a bucket 27. The swing frame 21 is pivotally mounted to the frame 12 about a vertical pivot axis. Swing frame hydraulic cylinders, not shown, swing the swing frame 21 relative to the frame 12. The boom 23 is pivotally coupled to the swing frame about a horizontal pivot and is raised and lowered by a boom hydraulic cylinder 29. The dipperstick 25 is pivotally mounted to the boom about a horizontal axis and is pivoted relative to the boom by dipperstick hydraulic cylinder 31. The bucket 27 is curled and uncurled relative to the dipperstick by bucket hydraulic cylinder 33.

The work implements and the vehicle itself are controlled from an operator's cab 40. The operator gains access to the operator's cab 40 through glass side doors 42 by mounting steps 43. From the interior of the cab the operator can view the outside through front windshield 44, side windows 45 and rear window panels 46. The operator's cab 40 is also provided with a roof 48.

The cab 40, as illustrated in FIGS. 2–5 is provided with a four-post roll over protection system (ROPS) 50. The ROPS comprises left and right front vertical posts 52 and 54, left and right rear vertical posts 56 and 58, laterally extending front and rear members 60 and 62 and left and right longitudinally extending members 64 and 66. The front and rear vertical posts are mounted to the floor 68 that forms part of the frame 12 of the vehicle 10.

The left and right rear vertical posts 56 and 58 are formed from hollow tubing having a rectangular cross section. Both rear vertical posts 56 and 58 are provided with bottom portions 70 and 72. The bottom portion of each vertical post extends upwardly, forwardly and outwardly from where the posts 56 and 58 are mounted to the floor 68. In forming the rear vertical posts the posts are twisted slightly so that the posts present a planar surface 73 that provides substantially perpendicular surface to the rear window panels 46. By arranging the rear vertical posts in this manner, the side visibility of the operator is increased during backhoe operations. In addition, the knee and toe clearance is increased when the operator rotates the operator's seat from a front facing to rear facing position.

Left and right intermediate vertical posts 74 and 76 are located between the front vertical posts 52 and 54 and the rear vertical posts 56 and 58. The windshield 44 is located between the left and right front vertical posts 52 and 54 beneath the laterally extending front member 60. The side doors 42 are located between the left and right front vertical posts 52 and 54 and the left and right intermediate posts 74 and 76 beneath left and right longitudinally extending members 64 and 66 and above the floor 68. The side windows 45 are located between the left and right intermediate posts and 74 and 76 and the left and right rear vertical posts 56 and 58 beneath left and right longitudinally extending members 64 and 66 and above left and right frame members 78 and 80. Longitudinally extending frame members 78 and 80 extend between the left and right intermediate vertical posts 74 and 76 and the left and right rear vertical posts 70 and 72. Three rear window panels 46 enclose the rear of the operator's cab 40. Two of the rear window panels extend rearwardly and inwardly from the left and right rear vertical posts 56 and 58 to left and right vertically extending mullions 82. These two window panels 46 are positioned beneath cantilevered frame 84 and the bottom portions 70 and 72 of the left and right rear vertical posts 56 and 58. Cantilevered frame 84 is mounted to the left and right rear vertical posts and extends rearwardly therefrom. A central rear window panel 46 is located between the left and right millions 82 beneath the cantilevered frame 84 and above the floor 68.

Figure 6:
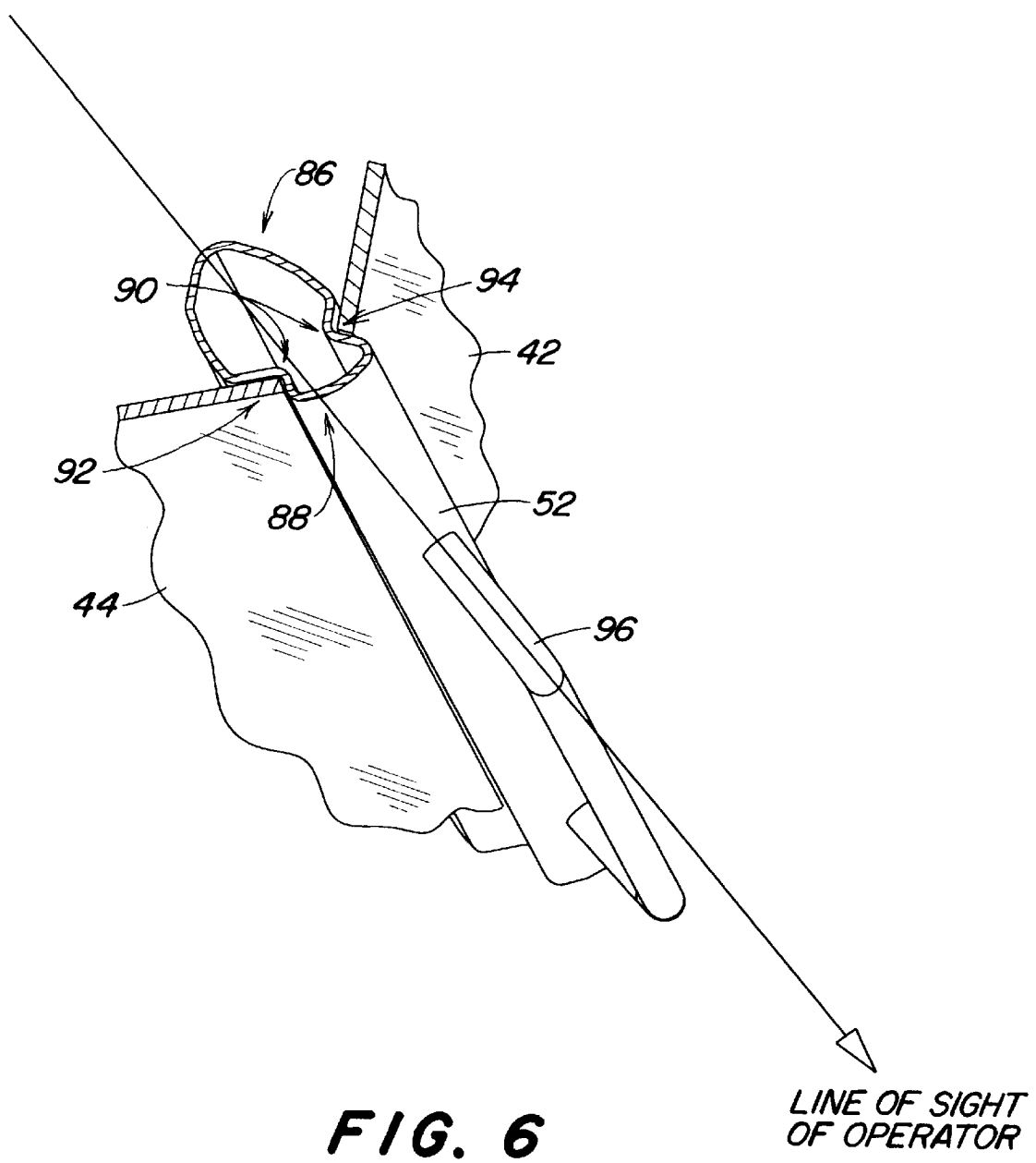
FIG. 6 is a partial cross sectional view of a vertical front post of the ROPS.

The left and right front vertical posts 52 and 54 have an arrowhead shaped cross section having a main lobe 86, a secondary lobe 88 and a connecting portion 90 joining the two lobes 86 and 88. The lobes 86 and 88 and the connecting portion 90 form a windshield channel 92 and a door channel 94. The window channel 92 receives a side edge of the windshield 44. The door channel 94 receives a side edge of the side door 42. The arrowhead shaped cross section of the front vertical posts provides an elongated axis. This elongated axis substantially corresponds to the line of sight of an operator when driving the work vehicle 10. The elongated axis passes through both lobes 86 and 88 and the connecting portion 90. The secondary lobe 88 is provided with an exterior handle 96 located outside the enclosure formed by the operator's cab 40. As illustrated in FIG. 6 the exterior handle 96 intersects the elongated axis and lies in the shadow of the left front vertical post 52 when viewed by the operator facing rearwardly. Similarly, the main lobe 86 is provided with an interior handle 98 extending into the enclosure formed by the operator's cab 40. The interior handles 98 also intersect the elongated axis and are located in the shadow of the front vertical posts 52 and 54 on which they are mounted. By using the arrow head shaped cross section of the front vertical posts 52 and 54, the visual range of the operator is increased while also providing a strong post that can accommodate the side edges of the windshield 44 and the side doors 42.

The present invention is illustrated a work vehicle 10 having an operator's cab 40. However the present invention can also be used in an open operator's station. As such the present invention should not be limited to the above-described embodiments, but should be limited solely to the claims that follow.

We claim:

1. A roll over protection system for work vehicle having a floor, the roll over protection system comprising:

left and right front vertical posts, the front vertical posts being mounted to the floor of the work vehicle;

a front laterally extending member extending between the left and right vertical posts;

left and right rear vertical posts, the vertical posts being mounted to the floor of the work vehicle, the left and right rear vertical posts each having a bottom portion, the bottom portion of both posts extend upwardly, forwardly and laterally outwardly from where the left and right rear vertical posts are mounted to the floor of the work vehicle;

a rear laterally extending member extends between the left and right rear vertical posts;

a left longitudinally extending member extends between the left front vertical post and the left rear vertical post;

a right longitudinally extending member extends between the right front vertical post and the right rear vertical post.

2. A roll over protection system as defined by claim 1 wherein the left and right rear vertical posts are hollow tubes having a rectangular cross section.

3. A roll over protection system as defined by claim 2 wherein the left and right rear vertical posts have a planar surface that is substantially perpendicular to left and right rear window panels.

4. A rollover protection system as defined by claim 3 wherein a cantilevered frame is mounted to the left and right rear vertical posts and the cantilevered frame extends rearwardly therefrom.

5. A roll over protection system as defined by claim 4 wherein two mullions extend from the cantilevered frame to the floor the mullions receiving a rear window panel.

6. A roll over protection system as defined by claim 1 wherein the left and right front vertical posts have an arrowhead shaped cross section having a main lobe, a secondary lobe and a connecting portion.

7. A roll over protection system as defined by claim 6 wherein the main lobe, the secondary lobe and the connecting portion define a windshield channel and a side door channel, and having an elongated axis passing between the channels.

8. A roll over protection system as defined by claim 6 wherein the arrowhead shaped cross section defines an elongated axis passing through the main lobe, the connecting portion and the secondary lobe.

9. A roll over protection system as defined by claim 8 wherein the roll over protection system defines an enclosure in which an operator is seated, the elongated axes of the left and right front vertical posts intersect in the enclosure.

* * * * *